United States Patent [19]
Iso et al.

[11] Patent Number: 5,612,933
[45] Date of Patent: Mar. 18, 1997

[54] APPARATUS FOR REPRODUCING RECORDED INFORMATION WITH ERROR DETECTION AND CORRECTION PROCESSING

[75] Inventors: Yoshimi Iso, Maebashi; Toshihiko Watanabe, Takasaki; Kazuya Hara, Isezaki; Akihiko Rokusaka, Kodaira; Hideaki Sato, Takasaki, all of Japan

[73] Assignees: Hitachi, Ltd.; Hitachi Microcomputer System Ltd., both of Tokyo, Japan

[21] Appl. No.: 464,121

[22] Filed: Jun. 5, 1995

[30] Foreign Application Priority Data

Jun. 17, 1994 [JP] Japan ................................. 6-159173

[51] Int. Cl.$^6$ ........................................................ G11B 7/00
[52] U.S. Cl. ............................ 369/32; 369/54; 369/53
[58] Field of Search .............................. 369/32, 50, 48, 369/54, 58, 53; 360/53, 10.1, 10.2, 73.3, 74.4

[56] References Cited

U.S. PATENT DOCUMENTS

| 4,752,846 | 6/1988 | Proehl | 360/72.2 |
| 4,821,125 | 4/1989 | Christensen et al. | 369/53 |
| 5,128,946 | 7/1992 | Ogino et al. | 369/58 |
| 5,313,443 | 5/1994 | Iitsuka | 369/48 |
| 5,349,481 | 9/1994 | Kauffman et al. | 360/53 |

FOREIGN PATENT DOCUMENTS

| 59-185071 | 3/1984 | Japan . |
| 61-122939 | 7/1986 | Japan . |
| 64-37728 | 1/1989 | Japan . |
| 2-287924 | 5/1990 | Japan . |

*Primary Examiner*—Nabil Hindi
*Attorney, Agent, or Firm*—Fay, Sharpe, Beall, Fagan, Minnich & McKee

[57] ABSTRACT

An apparatus for reproducing recorded information reads information from the track surface of a CD-ROM disk 1, performs error detection and correction processing on the read information to reproduce recorded information and then outputs the reproduced information. This apparatus includes a control device 11, which switches a reproduction operation to the standard speed mode in response to a correction failure condition generated in the quadruple speed mode and retries standard-speed reading of the information read with an error uncorrectable in the quadruple speed mode. Reducing the signal read speed to one-fourth in the retry processing at the standard speed improves the C/N ratio of the high-frequency signal RF by 6 dB, which in turn improves the correction capability for random errors.

15 Claims, 12 Drawing Sheets

APPARATUS FOR REPRODUCING RECORDED INFORMATION WITH ERROR DETECTION AND CORRECTION PROCESSING

BACKGROUND OF THE INVENTION

The present invention relates to a data reproducing technology for recorded information reproducing apparatuses such as CD-ROM (Compact Disk-Read only memory) reproducing apparatuses (CD-ROM drives).

The CD-ROM drive has rapidly become prevalent as a data reproducing apparatus for personal computers and game machines. The CD-ROM disk as an information storage medium has advantages of a large storage capacity, low cost, little degradation with elapse of time, and ease with which it can be mass-produced. Because it is based on the standard of audio CD players, however, there is a drawback that the data transfer speed and the data access speed are slow. Further, such processing as data interpolation and previous value holding is possible in audio applications when data error correction cannot be made, but such a technique makes no sense on personal computer data and it is therefore important to strengthen the data error correction capability of the data reproduction CD-ROM drive.

To cope with these problems, a variety of steps have been taken for the CD-ROM drive. They include: improving the data transfer speed by using a double speed reproduction technology, which involves raising the band of a preamplifier, strengthening the pickup servo circuit, improving the operation speed of a digital signal processing circuit and rotating the CD-ROM disk at two times the normal (standard) speed; improving the access speed (the moving speed of the pickup) by driving with a linear motor arm the pickup that reads data (signal) on the CD-ROM disk; and improving the error correction capability by using triplicated or more error correction codes instead of the existing duplicated error correction codes for the CD-ROM drive.

Further, there have recently been growing demands for high-speed access on inexpensive mechanisms that use no expensive linear motor arms, and for higher data transfer speeds. The access system currently in use employs a track count method that does not use a speed sensor. Such a technology is disclosed in Japan Patent Laid-Open Nos. 37728/1989 and 185071/1984. Generation of track crossing signals required by the track count access system is disclosed in Japan Patent Laid-Open Nos. 122939/1986 and 287924/1990. As to the data transfer speed, there are demands for improved speeds, such as four, six and eight times the normal speed (data transfer rate for the quadruple speed is some 600 Kbytes/sec).

SUMMARY OF THE INVENTION

Improving the data transfer rate requires a wider frequency band of a read signal and thus requires expanding the reproduction band of a preamplifier. The expanded reproduction band of the preamplifier also expands the noise band, which in turn degrades carrier-to-noise (C/N) ratio of the read signal. When the band doubles, the C/N ratio deteriorates by 3 dB; and when the band quadruples, it deteriorates by 6 dB. This in turn requires a system with a further enhanced error correction capability, and a digital signal processing circuit with a faster operation speed. Conventional systems with a standard speed (also called a 1-speed system whose data transfer rate is some 150 Kbytes/second) and those with a double speed (whose data transfer rate is some 300 Kbytes/second) are almost perfected. An ideal system for quadruple or higher speed has not yet been realized.

The CD-ROM drive for data reproduction, when it cannot read data precisely because of scores, dirt or dust on the CD-ROM disk, activates the digital signal processing circuit to perform error detection and error correction processing. If the data correction finally fails, data are transferred with an error flag. Because the CD-ROM drive knows that erroneous data is going to be transmitted, it normally retries reading several times before transferring the data with an error flag. In this case, the conventional procedures includes receiving an error message from the computer, cleaning the CD-ROM disk and allowing the CD-ROM drive to read the data in question again.

The inventors of this invention have found a drawback of the conventional CD-ROM drive and its system that although, when the CD-ROM disk condition is good, the use of a quadruple speed can increase the data transfer rate, when the CD-ROM disk condition is bad, the quadruple speed degrades the C/N ratio of the read signal from the CD-ROM disk, thereby increasing the error rates of the read signal and therefore the probability of error correction failure.

An object of this invention is to provide an apparatus for reproducing recorded information, which can lower the probability of error correction failure for read signals even when the CD-ROM disk condition is bad, without sacrificing the data transfer speed.

Another object of this invention is to provide an apparatus for reproducing recorded information, which can be optimized according to variations of read signal when the reproduction speed is changed in response to the access state, such as error correction failure and kind of read information (audio data, image data, etc.).

These and other objects and novel features of this invention will become apparent from the following description of this specification and the accompanying drawings.

Representative aspects of this invention may be briefly summarized below.

[1] In an apparatus for reproducing recorded information, which reads recorded information from a CD-ROM disk surface and which performs error detection and correction processing on the read information to reproduce the recorded information and then outputs the reproduced information, the apparatus of this invention comprises: a control means (11) to switch a reproduction mode from a first speed mode to a second speed mode in response to an error correction failure condition generated in the first speed mode and to retry reading the information read with an error uncorrectable in the first speed mode, the first speed mode being for reading recorded information at a first speed to reproduce it, the second speed mode being for reading at a second speed slower than the first speed to reproduce the recorded information that the apparatus failed to read correctly in the first speed mode.

[2] In a further aspect of this invention, the apparatus for reproducing recorded information comprises: a disk motor (2) to drive a CD-ROM disk which stores information on a spiral track thereof; a pickup (3) to read information recorded on the track of the surface of the disk; a high-frequency amplifier (6) to amplify the information read through the pickup; a servo control means (10) to control a position of the pickup on the track according to an output of the high-frequency amplifier; a digital signal processing means (7) to control a rotating speed of the disk motor according to the output of the high-frequency amplifier and to perform demodulation and error detection and correction processing on read information obtained from the output of the high-frequency amplifier; and a control means (11) to switch a reproduction mode from a first speed mode to a second speed mode in response to an error correction failure condition generated in the first speed mode and to retry reading the information read with an error uncorrectable in the first speed mode, the first speed mode being for reading recorded information at a first speed to reproduce it, the second speed reproducing mode being for reading at a second speed slower than the first speed to reproduce the recorded information that the apparatus failed to read correctly in the first speed mode.

[3] In a further aspect of this invention, the apparatus which controls the reproduction mode according to the kind of information to be read (object information being accessed) includes a control means, which switches a reproduction operation to a first speed mode to read recorded information at a first speed to reproduce it when the recorded data on the CD-ROM disk is data and to a second speed mode to read recorded information at a second speed slower than the first speed to reproduce it when the recorded data on the CD-ROM disk is audio information.

[4] In the above third aspect [3], it is also possible to provide the control means with a circuit to reduce the probability of error correction failure when the object information being accessed is data. That is, the function to be added to the control means changes the first speed mode to the second speed mode in response to an error correction failure condition generated in the first speed mode and retries reading the information read with an error uncorrectable in the first speed reproduction mode.

[5] In each of the above aspects, the first speed may be more than two times faster than the second speed.

A further aspect of this invention is that the apparatus includes the following circuit (means) to optimize the circuit characteristics according to variations of read signal frequency that occur when the reproduction speed is switched according to the access condition such as error correction failure and the kind of information being read.

[6] The high-frequency amplifier includes a band switching circuit (means) (60) that narrows the reproduction band in the second speed mode compared to the band in the first speed mode.

The band switching circuit (means) comprises a circuit element (C1, C3) for changing a frequency characteristic and a switch element (6067, 6068) for selectively isolating the circuit element, and is provided to a waveform equalizing filter (606), which forms a peak at a boundary between a low frequency pass band and a frequency attenuation band for read information from the pickup to perform waveform equalization.

[7] The servo circuit has a track crossing signal generation circuit (110), which outputs a track crossing signal (TCR) that changes according to the track crossing cycle when the pickup is forcibly moved in a direction crossing the track to jump to a desired track. This track crossing signal generation circuit comprises an envelope detector (111) to detect an envelope signal (EVP) of the high-frequency signal (RF) output from the high-frequency amplifier, and a low-pass filter (113) which removes a high-frequency component from the tracking error signal (TER) output from the high-frequency amplifier. The track crossing signal generation circuit generates the track crossing signal by latching a binary signal of the envelope signal in synchronism with the edge transition of a binary pulse signal of the output from the low-pass filter. The envelope detector generates the envelope signal by performing the charging and discharging according to the cycle of the high-frequency signal output from the high-frequency amplifier. The envelope detector may include a detection time constant switching circuit (means) (100) that increases the discharge time constant in the second speed mode compared to that of the first speed mode.

The envelope detection circuit includes a capacitor (1110) and constant current circuits (1111, 1112) to determine the discharge time constant. To increase the detection time constant, the amount of current flowing through the constant current circuit may be switched to a greater value.

[8] The low-pass filter may include a pass band switching circuit (means) (100, 1133, 1134) which provides a higher pass band in the second mode compared to that of the first speed mode.

With the above-mentioned circuit (means) incorporated, a CD-ROM drive, having a plurality of reproduction modes such as standard speed (single speed), double speed and quadruple speed, is normally operated at the highest data transfer speed such as quadruple speed (first speed reproduction mode). In the event of an error correction failure, the retry processing is performed several times in the quadruple speed mode. If an error correction failure flag still persists (the error correction failure condition continues)., the reproduction mode is switched to the double or standard speed (second speed mode) and the retry processing is carried out again. Performing the retry processing by switching to the second speed mode such as standard speed mode—when an uncorrectable read error occurs during the first speed mode such as quadruple speed mode—means that the signal read speed is reduced by one-fourth improving the C/N ratio of the high-frequency signal by 6 dB. This in turn improves the error correction for random errors and therefore the overall reliability of the CD-ROM drive and the whole system using it.

In this case, the high-frequency amplifier for read signal, or the waveform equalizer contained in it, may be subjected to the band switching operation whereby the frequency band is expanded during the quadruple speed mode and narrowed during the standard speed mode so that its frequency characteristic can be optimized both in the quadruple and standard speed modes. This further enhances the error correction capability that is improved by the retry processing performed in the standard speed mode.

In the quadruple speed mode the carrier frequency is increased. The envelope detector (111) has its characteristic made switchable so as to reduce the discharge time constant in the quadruple speed mode. Even when the envelope frequency is increased by reducing the discharge time constant and increasing the carrier frequency (i.e., even when the movement of the pickup is made faster), the resulting noise can be made equal to that of the standard speed mode. This allows the track crossing signal (TCR) to be increased in frequency, which in turn makes it possible to produce a good track crossing signal (TCR) even when the pickup is moved at high speed to a desired track during data access at the quadruple speed. In the track count access system, too, the high-speed movement of the pickup becomes possible during the quadruple speed mode. In other words, in the apparatus whose operation mode is switched between the quadruple speed mode and the standard steed mode, it is possible to optimize the track crossing speed of the pickup by selecting a desired one from two speeds. This ensures, for the track jump operation, the improvement of the error correction capability of the retry processing, which is performed in the standard speed mode when an error uncorrectable in the quadruple speed mode persists.

Because the low-pass filter (113) that receives the tracking error signal (TER) also has its frequency characteristic made selectable according to whether the mode is the standard or quadruple speed, it is possible to produce a waveform with little noise even during the standard speed mode. Not only is the low-pass filter optimized in the quadruple speed mode, but this noise reduction in the tracking error signal achieves the objective of activating the standard speed mode in which to perform the retry processing for improving the error correction when an error persists that cannot be corrected in the quadruple speed mode. This circuit, therefore, contributes to the improvement of the quality of the track crossing signal and realizes stable accesses with fewer correction failures not only during the quadruple speed mode but also in the retry processing during the standard speed mode.

The frequency characteristic of the waveform equalizer (606) of the high-frequency amplifier is optimized by making it switchable according to the reproduction mode (standard or quadruple speed), and the frequency characteristics of the envelope detector (111) and the low-pass filter (113), which generate the track crossing signal TCR used for track jump, are also made switchable for optimization according to the reproduction mode. This means that the standard speed mode is set also when the object being accessed (information recorded on the CD-ROM disk) is audio data. It is therefore possible to realize high-quality reproduction of audio information and other data.

DETAILED DESCRIPTION OF THE PREFERRED EMBODIMENTS

Figure 1:
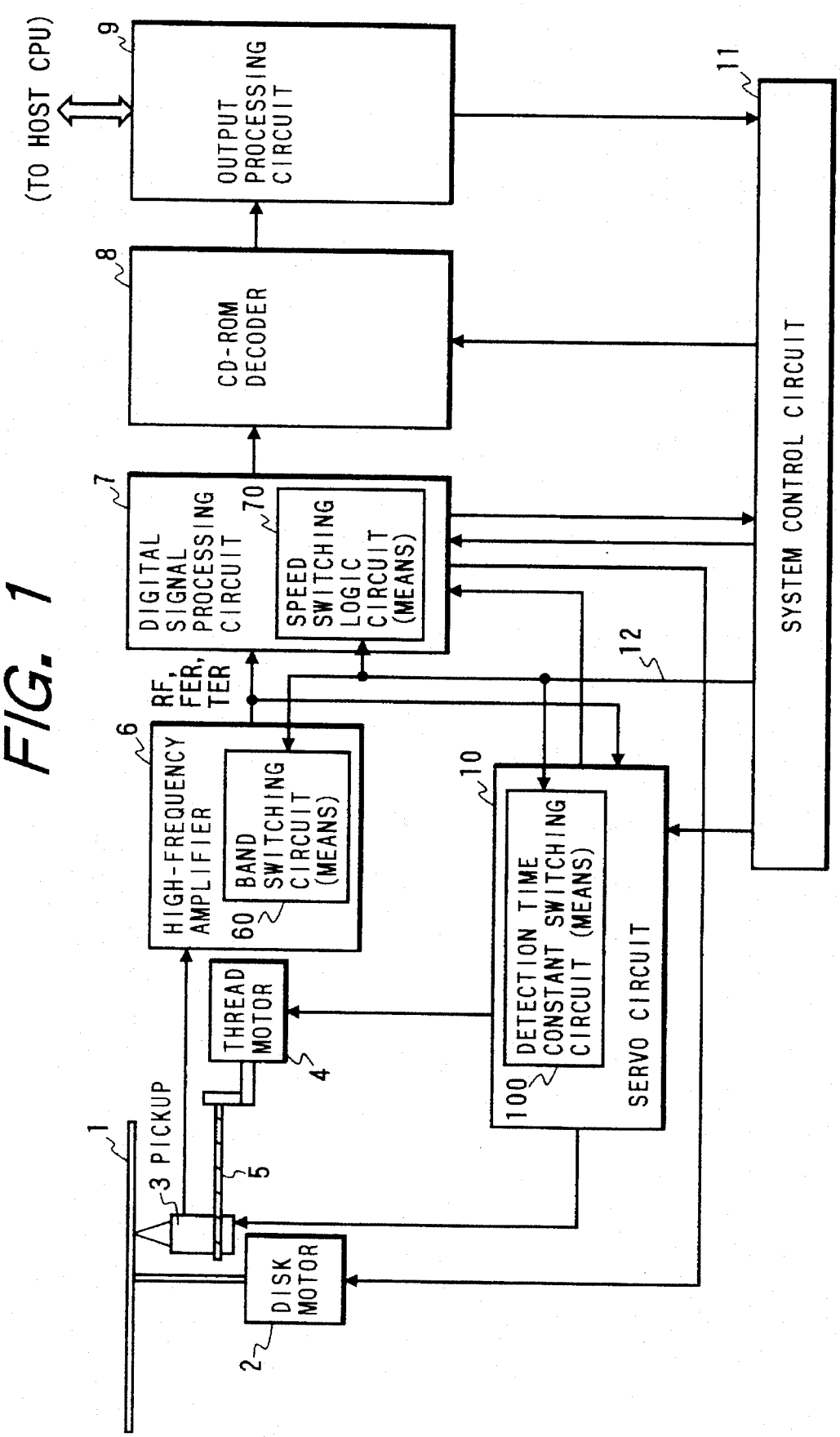
FIG. 1 is a block diagram of a CD-ROM reproducing apparatus as one embodiment of this invention.

FIG. 1 is a block diagram showing a CD-ROM reproducing apparatus as one embodiment of this invention. The CD-ROM reproducing apparatus of this embodiment has two reproducing modes—a standard speed reproduction and a quadruple speed reproduction. Denoted 1 is a CD-ROM disk that employs a constant linear velocity (CLV) system, in which data is recorded in a spiral track at a constant linear velocity (the signal recording rate is constant whether the recording position is at the inner or outer circumferential part of the CD-ROM disk) to increase the recording density. Hence, the revolution of a motor 2 is varied according to the read position of the CD-ROM disk 1. The CD-ROM disk 1 stores a large number of frames of information having a data field and a subcode field. Each frame of information includes a synchronizing signal, data, an error correction code, information on an absolute time from the starting point to the position on the spiral track, and information to determine whether the data field information is audio information or data. The absolute time information includes significant information on a plurality of frames, for example, 98 frames. Information stored at the innermost part of track of the CD-ROM disk 1 includes information used to specify data stored in the data field, data indexing information, and information to determine whether the stored information is audio information or data. Data in the data field and the subcode field uses an eight-to-fourteen modulation (EFM) scheme. The EFM modulation converts 8-bit data for one symbol to 14-bit data. Further, to remove a DC component after conversion, three margin bits are added to the data to perform an NRZI modulation. One frame contains data for 24 symbols and also an error correction code.

The CD-ROM disk 1 is rotated by the disk motor 2 and the information recorded on the CD-ROM disk 1 is read by a pickup 3 that is moved in the radial direction of the CD-ROM disk 1. The pickup 3 throws a laser beam from a semiconductor laser against the CD-ROM disk 1 through an object lens (not shown), receives a reflected light by a photodetector unit formed of a photodiode and converts it to an electric signal. The pickup 3 has a focusing actuator to move the object lens in the direction of depth so that the lens focus lies on a disk signal plane, and a tracking actuator to move the object lens in the radial direction. Because the travel of the lens driven by the tracking actuator is limited, a thread motor 4 is provided to move the entire pickup 3 in the disk radial direction. The thread motor 4 rotates a lead screw shaft 5 screwed into a holder of the pickup 3.

Information read from the pickup 3 is sent to a high-frequency amplifier 6 working as a preamplifier, which in turn outputs a high-frequency signal RF, a focus error signal FER and a tracking error signal TER. The high-frequency signal RF is digitized and fed to a digital signal processing circuit 7 where it is demodulated and error-corrected based on the error correction code. The symbol data in the CD-ROM disk 1 is interleaved (distributed) at time of recording. Data reproduced from the CD-ROM disk 1 has random errors due to noise and disk scores. The error correction code to cope with these errors may, for example, have a Reed-Solomon code added two times, one time before and one time after the interleave processing. The interleave and the Reed-Solomon code combined in this manner are called a cross interleave Reed-Solomon code (CIRC). The error correction for this scheme includes a C1 correction based on parity and a C2 correction based on deinterleave and parity. Data that has failed to be error-corrected in all attempts is added an error flag.

The data processed by the digital signal processing circuit 7 is fed to a CD-ROM disk decoder 8 in a format of the CD-ROM disk 1 and then is converted by an output processing circuit 9 into a data format compatible with external interface specifications such as small computer system interface (SCSI) and integrated device electronics (IDE) before being supplied to a host CPU.

The focus error signal FER and the tracking error signal TER output from the high-frequency amplifier 6 are supplied to a servo circuit 10, which performs focusing and tracking servo controls on the pickup 3 and also carries out pickup feed and track jump controls by driving the thread motor. The focusing servo controls the object lens to keep constant the relative distance between the object lens and the disk signal plane so that the disk signal plane remains within the focus depth of the laser beam when the track surface of the CD-ROM disk 1 fluctuates during rotation. The tracking servo controls the laser beam of the pickup to accurately trace the track, which has an interval of 1.6 µm, even when the disk rotates off center. The feed servo is a control to make the pickup follow the spiral track by the thread motor. The tracking servo and the feed servo combine to achieve the precise tracking by the pickup. The track jump is a processing that involves turning the servo system off, causing the pickup to jump from the present track to a desired track by controlling the thread motor, and then turning on the servo system to make fine adjustments.

A system control circuit 11 is interfaced with the output processing circuit 9, the digital signal processing circuit 7 and the servo circuit 10 and comprises, for instance, a microcomputer and a random logic circuit to control the overall operation of the CD-ROM reproducing apparatus. The revolving speed of the disk motor 2 is controlled by the digital signal processing circuit 7. When a specified state in which an error fails to be corrected by the digital signal processing circuit 7 is found, this is notified from the digital signal processing circuit 7 to the system control circuit 11.

Figures 2A, 2B:
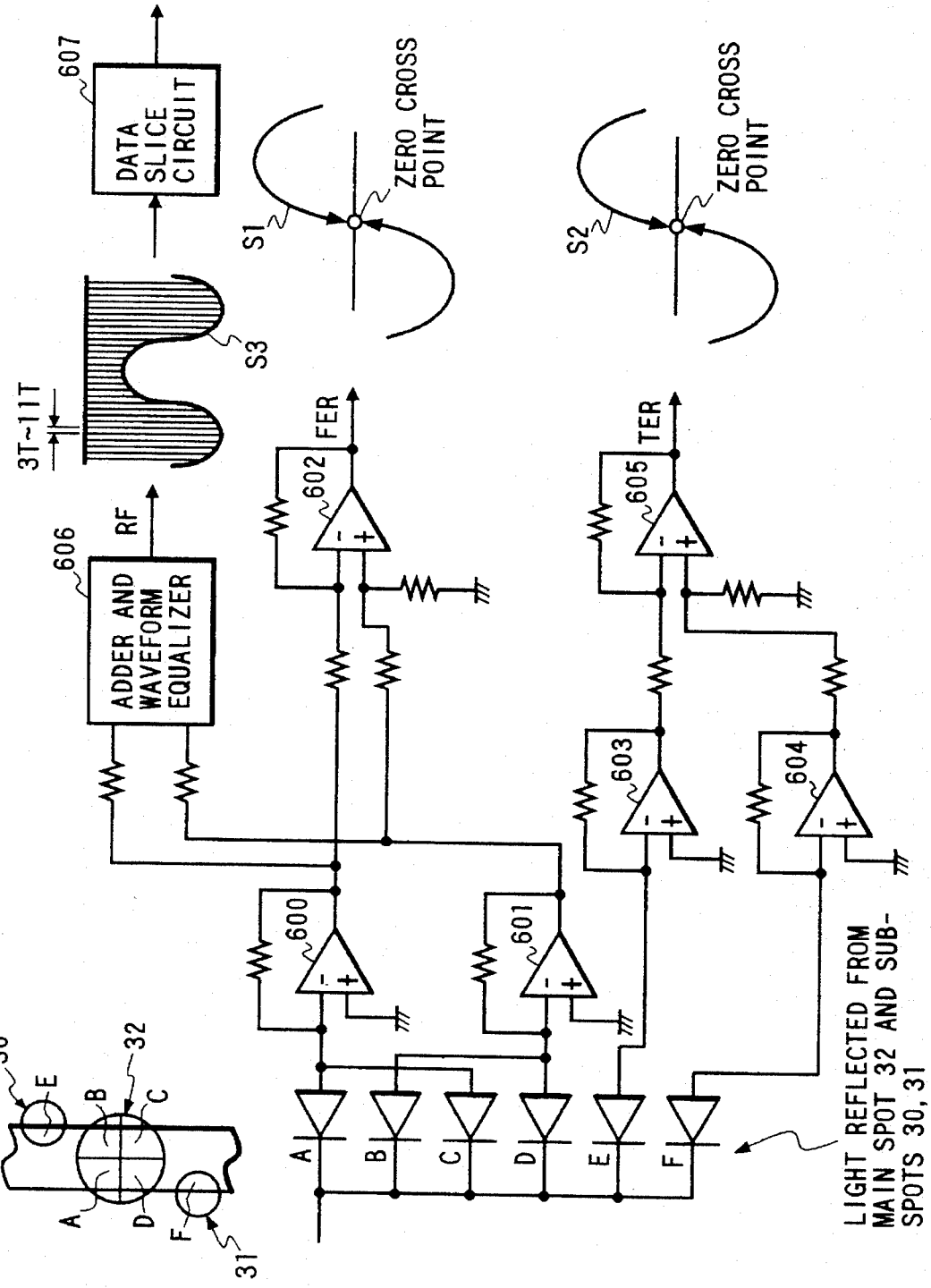
FIG. 2A is an example circuit of a high-frequency amplifier.
FIG. 2B is a schematic diagram showing one example method of detecting a tracking error signal.

FIG. 2A shows one example circuit of the high-frequency amplifier 6. FIG. 2B shows an example method of detecting tracking error signals, required to control the laser beam of the pickup to trace the track precisely. The pickup 3 may be of a three-spot system, which has photodiodes A, B, C, D, E, F to receive light reflected from a main spot 32 and two sub-spots 30, 31 located on each side of the track or pit. Two pairs of diagonally arranged photodiodes A, C and B, D that correspond to the main spot 32 have their currents combined in each pair and converted into voltages by current-voltage conversion circuits 600, 601. The voltages thus converted are fed to a subtraction circuit 602 which detects a difference between them and outputs it as the focus error signal FER.

When the object lens of the pickup 3 is within the focus depth, the main spot 32 is formed as a circle uniformly concentrating on the photodiodes A to D; when the object lens is too near, the main spot 32 is formed in an oval shape concentrating on the photodiodes A, C; and when the object lens is too far, the main spot 32 is formed in an oval shape concentrating on the photodiodes B, D. Hence, when the object lens is within the focus depth, the output of the subtraction circuit 602 is 0. The focus error signal FER has a waveform represented by S1 in the figure. The servo circuit 10 controls the position of the object lens of the pickup 3 by the focusing actuator so that the focus error signal FBR is zero.

The currents of the photodiodes E, F corresponding to the sub-spots 30, 31 are converted into voltages by the current-voltage conversion circuits 603, 604. The converted voltages are differentiated by a subtraction circuit 605, which outputs a voltage difference as a tracking error signal TER. When the object lens of the pickup 3 is positioned at the center of the pit or track, the overlaps over the pit or track of the sub-spots 30, 31 on the left and right are equal; when the object lens is shifted to the right, the overlap of the left sub-spot 31 becomes relatively large; and when the object lens is deviated to the left, the opposite is true. Therefore, when the object lens correctly follows the pit or track, the output of the subtraction circuit 605 is 0. The tracking error signal TER has a waveform represented at S2 in the figure. The servo circuit 10 controls the position of the object lens of the pickup 3 by the tracking actuator so that the tracking error signal TER is zero.

Figure 3A:
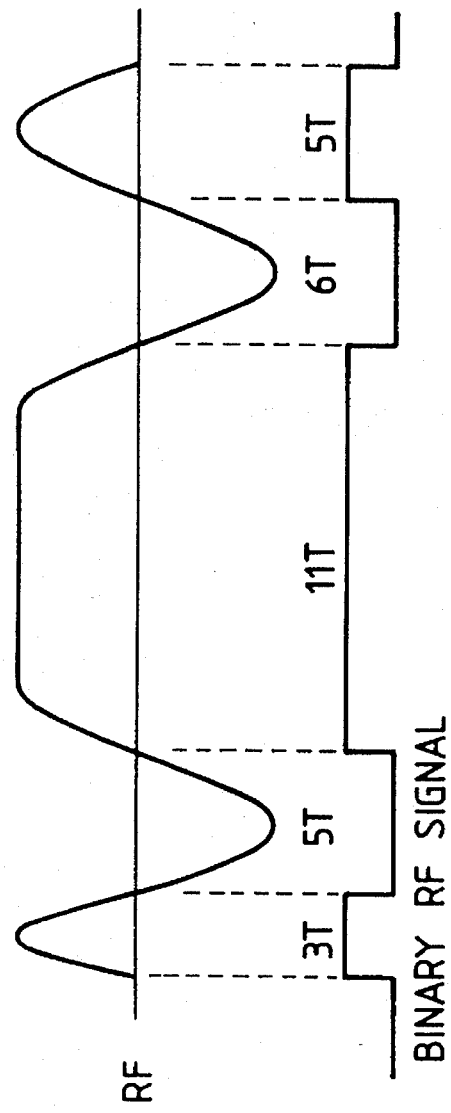
FIG. 3A is a waveform diagram showing how a high-frequency signal RF is digitized by a slice circuit.

The outputs of the current-voltage conversion circuits 600, 601 are supplied to an adder and waveform equalizer 606 where they are transformed into a high-frequency signal RF. The high-frequency signal RF in this embodiment is an EFM signal, whose envelope waveform S3 is maximum when the lens is directly above the track and minimum when it is intermediate between the tracks. The modulated signal waveform has a cycle ranging from 3T to 11T where T represents a reference cycle. Such a high-frequency signal RF is digitized by a data slice circuit 607 and then supplied to the digital signal processing circuit 7. FIG. 3A shows how the high-frequency signal RF is digitized by the data slice circuit 607. The binary signal is supplied to the digital signal processing circuit 7 where it is demodulated and error-corrected.

Figure 3B:
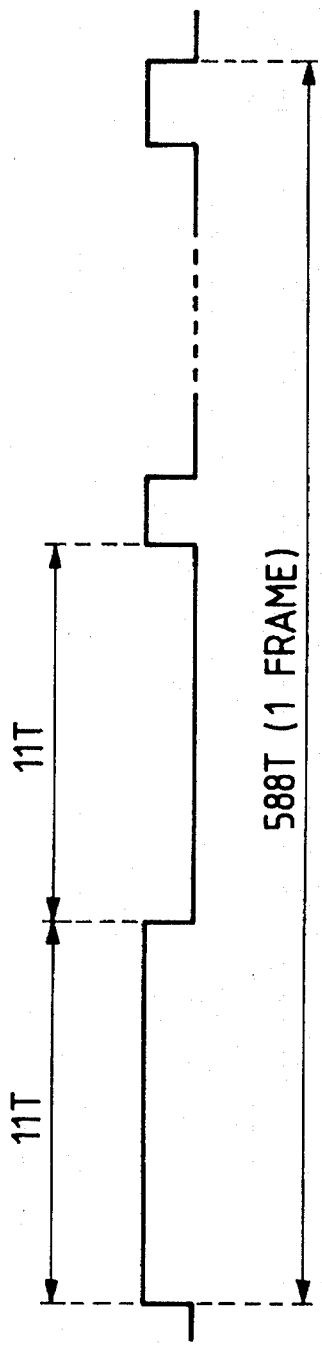
FIG. 3B is a waveform diagram of a synchronous signal contained in the high-frequency signal RF.

The digital signal processing circuit 7 detects a synchronous signal from the binary signal to control the revolution speed of the CD-ROM disk 1 by the disk motor 2. That is, as shown in FIG. 3B, the EFM-modulated signal has 588T in one frame and is given signals 11T—11T as a synchronizing signal at the head of each frame. The digital signal processing circuit 7 controls the disk motor 2 so that the detection interval of the synchronous signal 11T—11T, which appears every 588T, is constant and that the linear velocity of the track with respect to the pickup 3 is constant.

The CD-ROM reproducing apparatus of this embodiment has two reproducing modes, a quadruple speed reproduction and a standard speed reproduction. As shown in FIG. 1, the digital signal processing circuit 7 has a speed switching logic circuit (means) 70 to control the revolution speed of the disk motor 2 according to the operation mode and to control the digital signal processing speed. The speed switching logic circuit 70 is commanded by the system control circuit 11. The quadruple speed reproduction is a reproducing mode in which the rotating speed of the CD-ROM disk 1 is set at four times that of the standard speed mode to make four-fold the speed of reading information into the high-frequency amplifier 6 and the digital signal processing speed. This in turn allows the speed of data transfer from the output processing circuit 9 to the outside to be increased four times.

In the quadruple speed mode the frequency band of signals read from the CD-ROM disk 1 expands, so that it is necessary to widen the reproduction band of the high-frequency amplifier 6. Expanding the reproduction band, however, widens the noise band and therefore degrades the C/N ratio of the read signal. For example, when the frequency band doubles, the C/N ratio degrades by 3 dB; and when the frequency band quadruples, the C/N ratio deteriorates by 6 dB. To deal with this problem, the following measures are taken:

(1) The system control circuit 11 retries reading in the standard speed mode in the event of a read error and Gives the corresponding command to the speed switching logic circuit (means) 70;

(2) A band switching circuit (means) 60 is provided to optimize the frequency characteristic of the waveform equalizer of the high-frequency amplifier 6 in the quadruple speed mode and the standard speed reproduction mode; and (3) The servo circuit 10 is provided with a detection time constant switching circuit (means) 100 that optimizes, in the quadruple speed mode and the standard speed mode, the envelope detection characteristic which is used to generate the track crossing signal for track Jump. These are detailed in the following.

Figure 4:
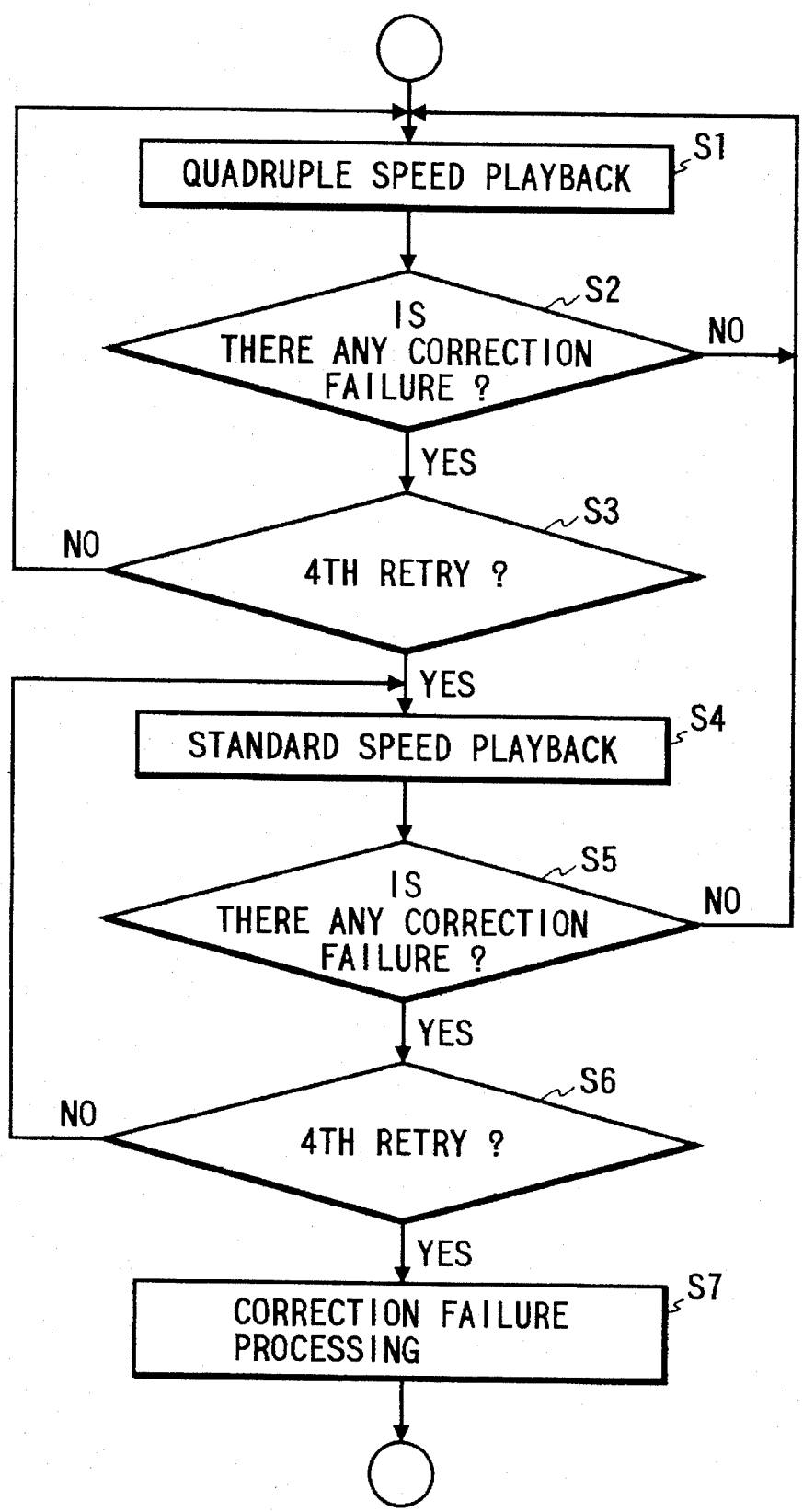
FIG. 4 is a flow chart showing the steps performed by the retry processing during the standard speed reproducing mode.

FIG. 4 shows a sequence of steps taken when the retry processing is performed in the standard speed mode. Normally, the quadruple speed reproduction is performed (step S1). If the digital signal processing circuit 7 finds an error to be uncorrectable (step S2), three retries, for instance, are carried out in the same quadruple speed mode. If the error is still uncorrectable (step 3), the reproduction operation is changed to the standard speed mode (step S4). Then, the retry is carried out at the standard speed and if three retries fail to correct the error (step S5, S6), a correction failure processing is done to add an error correction failure flag to the data in question (step S7). This control is performed by the system control circuit 11 of FIG. 1.

The command signal for making a switch from the quadruple speed mode to the standard speed mode, which is to be performed in the step S4, is fed to the speed switching logic circuit (means) 70, the band switching circuit (means) 60 and the detection time constant switching circuit (means) 100. A signal 12 of FIG. 1 represents a command signal for switching between the quadruple speed mode and the standard speed mode.

When a command signal for switching from the quadruple speed mode to the standard speed mode, which is to be performed by step S4, is issued from the system control circuit 11, the speed switching logic circuit (means) 70 of the digital signal processing circuit 7 changes the operation frequency of the digital signal processing circuit 7 to one-fourth the current frequency and controls the disk motor 2 so that the detection interval of the synchronizing signal appearing every 588T is one-fourth that of the quadruple speed mode, thereby reducing the linear velocity of the track relative to the pickup 3 to one-fourth. Reduction to one-fourth of the signal read rate improves the C/N ratio of the high-frequency signal RF by 6 dB, which in turn improves the correction rate of random errors. This means that the reliability of the system is improved.

Figure 5:
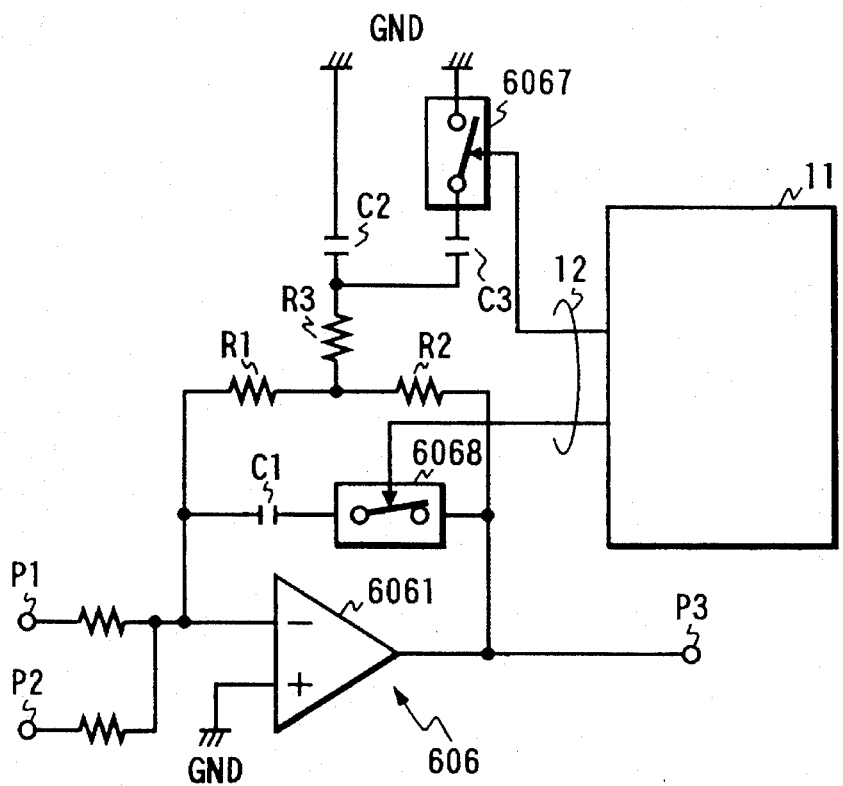
FIG. 5 is an example circuit of an adder and a waveform equalizer contained in the high-frequency amplifier.
Figure 6:
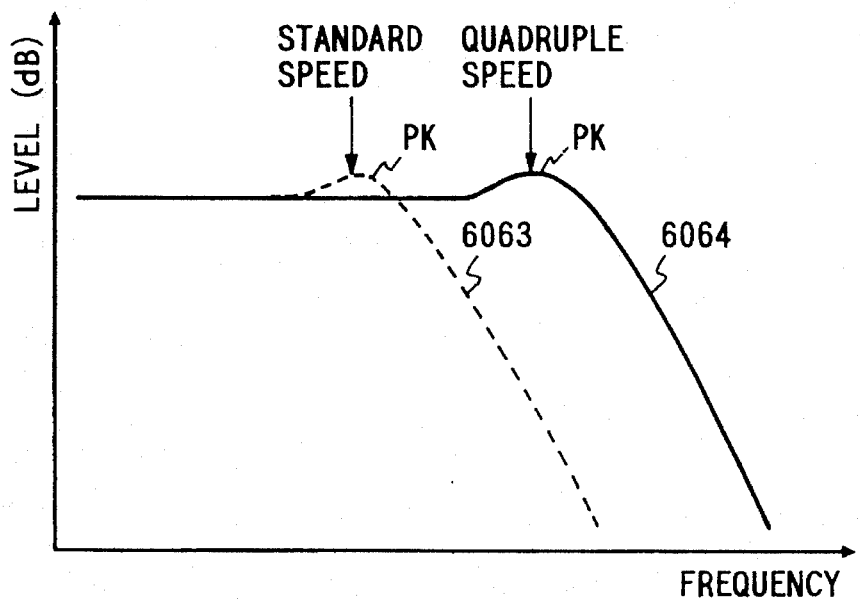
FIG. 6 is a diagram showing a switchable frequency characteristic in the adder and the waveform equalizer of FIG. 5.
Figure 7:
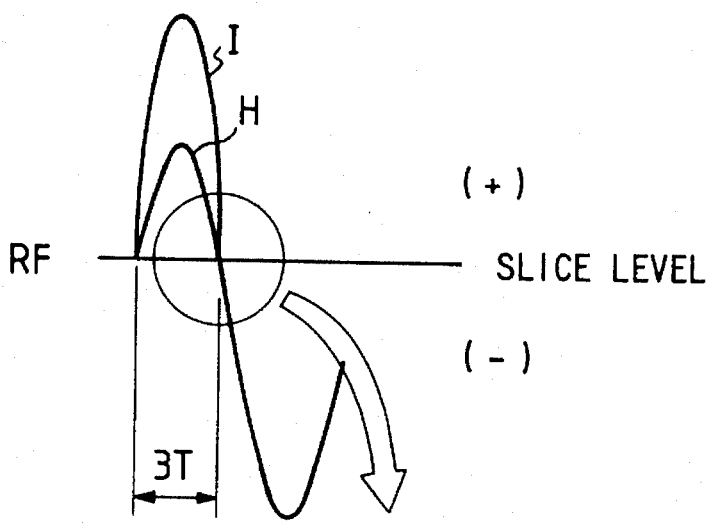
FIG. 7 is a schematic diagram showing the action of the equalizer.
Figure 7:
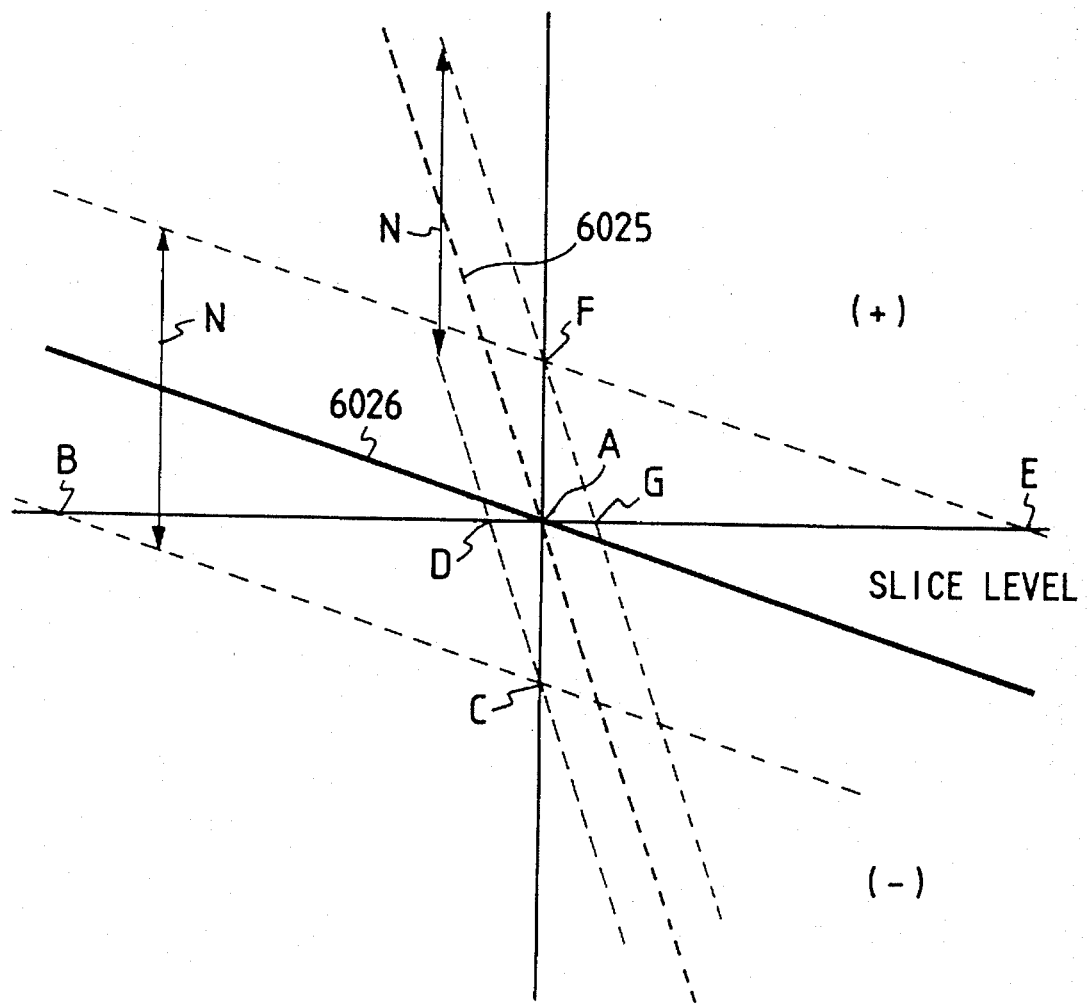

The band switching circuit (means) 60 that receives the command signal for switching from the quadruple speed mode to the standard speed mode is included in the adder and waveform equalizer 606. FIG. 5 shows an example circuit of the adder and waveform equalizer 606. The circuit consists mainly of an adder formed of an operational amplifier 6061, which is supplied at a terminal P1 with an output from the current-voltage conversion circuit 600 and at a terminal P2 with an output from the current-voltage conversion circuit 601 and which adds up these two inputs and outputs the added result from a terminal P3. At this time resistors R1, R2, R3 and capacitors C1, C2, C3 combine to realize a waveform equalizing filter that functions as a low-pass filter having a peak at the boundary between the pass band and the attenuating band. The frequency characteristics of the standard speed mode and the quadruple speed mode are represented by curves 6063, 6064 of FIG. 6, respectively, with peaks formed at PK. Such peaks work to increase the amplitude of a relatively high carrier frequency (a waveform equalization). In other words, if such a waveform equalization is not performed, a part of the waveform having high frequency (short period) such as 3T shown in FIG. 7 will, at the transition area from the low-pass band to the attenuation band, reduce its inclination and amplitude to relatively small values (waveform H). When the waveform equalization is performed, however, the peak of the frequency characteristic causes the waveform amplitude and inclination to increase as represented by a waveform I. These two waveforms are compared in an area close to the slice level of the data slice circuit 607. In FIG. 7, symbol N denotes the amplitude of a noise component, 6025 the center of a waveform-equalized signal, and 6026 the center of a signal not waveform-equalized. There is a possibility that the signal not waveform-equalized may be affected by the noise component and erroneously detected in the area of ΔABC and ΔAEF. For the waveform-equalized signal, on the other hand, the area where erroneous detection may occur is significantly reduced to ΔADC and ΔAGF.

In FIG. 5, capacitors C1, C3 and switches 6067, 6068 form the band switching circuit (means) 60. According to the command requesting the quadruple speed mode, these two switches 6067, 6068 are turned off. The frequency characteristic at this time is as shown at 6064 of FIG. 6. In the standard speed mode, these switches 6067, 6068 are turned on and the frequency characteristic at this time is changed to the curve represented by 6063. The capacitor C1, when connected by the switch 6068, works to narrow the frequency band, and the capacitor C3, when connected by the switch 6067, works to shift the peak toward the lower-band side.

If the frequency characteristic in the standard speed mode is the same as in the quadruple speed mode, the amount of noise component with high frequencies increases. At the same time, the waveform equalization cannot be performed on the needed signal component with high frequency contained in the high-frequency signal RF, degrading the digitization precision of the high-frequency signal RF. Hence, by performing the band switching to expand the frequency band in the quadruple speed mode and to narrow the frequency band in the standard speed mode, it is possible to optimize the frequency characteristic of the adder and waveform equalizer 606 in the quadruple speed mode and the standard speed mode. This further enhances the degree of improvement when it is attempted to improve in the standard speed mode the error correction rate that occurred in the quadruple speed mode.

Figure 8:
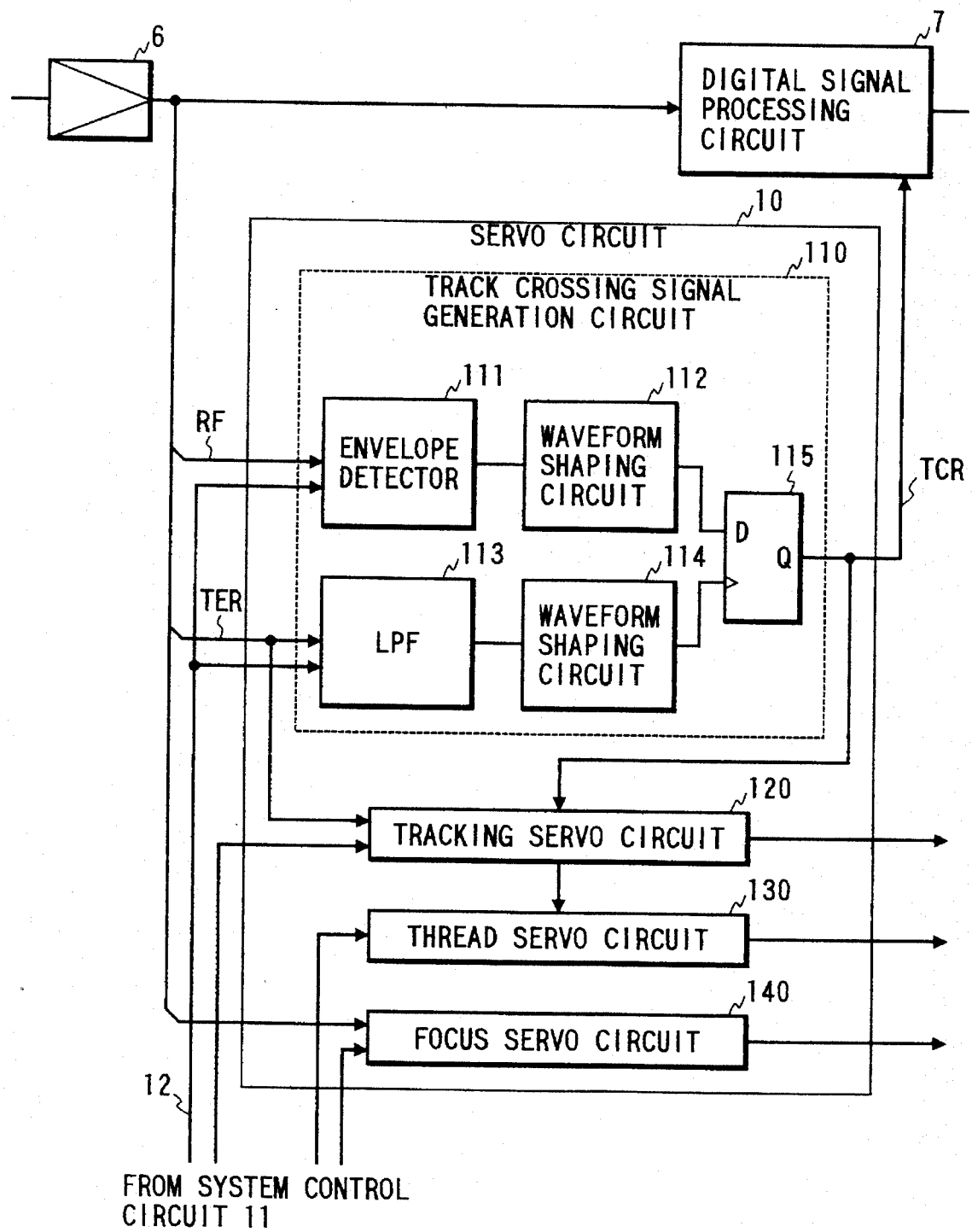
FIG. 8 is an example block diagram of a servo circuit.

FIG. 8 shows an example block diagram of the servo circuit 10. The servo circuit 10 comprises a track crossing signal generation circuit 110, a tracking servo circuit 120 for performing the tracking servo control, a thread servo circuit 130 for performing the thread servo and feed servo controls, and a focus servo circuit 140 for performing the focus servo control.

The track crossing signal generation circuit 110 generates a track crossing signal TCR to move the pickup 3 to a desired track by a track count method, and comprises an envelope detector 111 to detect an envelope of the high-frequency signal RF, a waveform shaper 112 to digitize the output of the envelope detector 111, a low-pass filter 113 to which the tracking error signal TER is input, a waveform shaper 114 to digitize the output of the low-pass filter 113 and to detect rising and falling edges of the binary signal, and a latch circuit 115 to latch the output of the waveform shaper 112 in response to the edge detection signal from the waveform shaper 114 and to produce a track crossing signal TCR.

Figure 9:
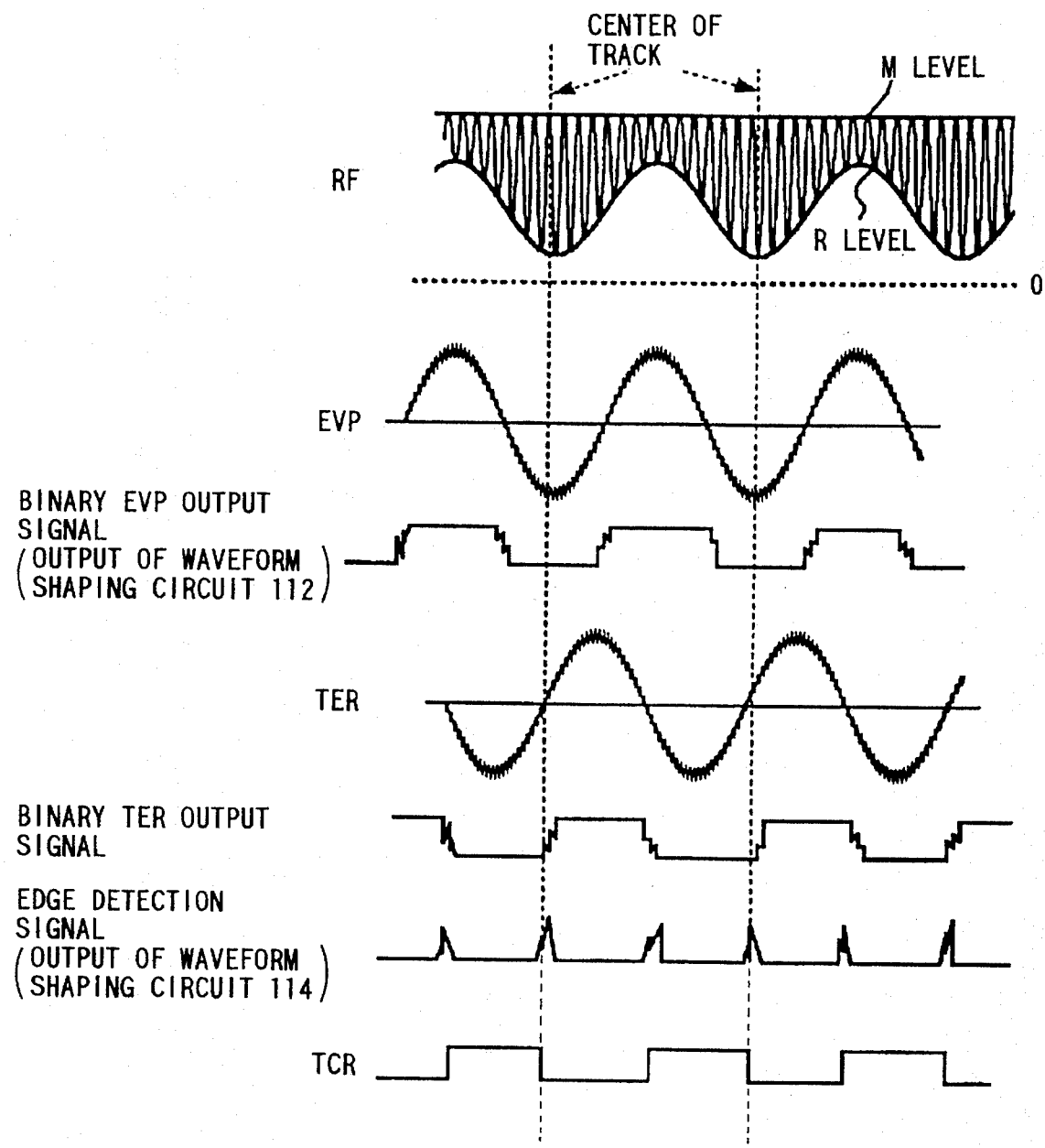
FIG. 9 is an example waveform diagram showing signals generated by a track crossing signal generation circuit.

First, the operation of generating the track crossing signal as performed by the track crossing signal generation circuit 110 is explained. In the track jump operation, the tracking servo circuit 120 is stopped and then the thread servo circuit 130 starts the thread motor 4 to move the pickup 3 in the radial direction of the track. This causes the high-frequency signal RF and the tracking error signal TER, both shown in FIG. 9, to be supplied to the track crossing signal generation circuit 110. In FIG. 9, a 0 level of the high-frequency signal RF corresponds to a so-called dark level where the outputs of the photodiodes A-D of the main spot 32 of FIG. 2 are zero; an M level corresponds to a so-called mirror surface level where the reflected light from the main spot 32 is maximum; and an R level represents an envelope of the pit surface level that changes as the track crosses the main spot 32. The tracking error signal TER changes according to the positions relative to the track of the sub-spots 30, 31 of FIG. 2. Because the outputs of the sub-spots 30, 31 are so set as to be equal when the main spot 32 is positioned at the center of the track, the tracking error signal TER output from the subtraction circuit 605 is zero. When the spot moves relatively to the right of the track, the output of the subtraction circuit 605 changes to a positive value. When the spot moves to the left, the output changes to the negative side. While the spot is located between adjacent tracks, the output is changed in reverse directions. The frequencies of the high-frequency signal RF and the tracking error signal TER in the track jump operation are increased in proportion to the moving speed of the pickup 3 driven by the thread motor 4.

The envelope detector 111 detects an envelope signal EVP of the high-frequency signal RF, which is converted into a binary pulse signal (output signal) by the waveform shaper 112. The tracking error signal TER is removed of a high frequency component by the low-pass filter 113 and is then digitized into a binary pulse signal (output signal) by the waveform shaper 114 which detects the edge the pulse. The most intense part of the high-frequency signal RF corresponds to a position directly above the track, and in this on-the-track condition the tracking error signal TER is at the zero-cross point. Hence, the tracking error signal TER is 90 degrees out of phase with the envelope signal EVP. The latch circuit 115 latches the binary pulse (output signal) of the envelope signal EVP in synchronism with the edge transition of the binary pulse of the tracking error signal TER and outputs the track crossing signal TCR. As is evident from the phase relationship between the tracking error signal TER and the envelope signal EVP, because the logic value of the binary pulse (output signal) of the envelope signal EVP is fixed at the latch timing even if an unwanted level change occurs at the transition timing of the binary pulse (output signal) of the envelope signal EVP and the edge signal due to noise components contained in the envelope signal EVP and the tracking error signal TER, the track crossing signal TCR, a pulse signal output from the latch circuit 115, is virtually free from noise components. The number of pulses of track crossing signal TCR is counted by the digital signal processing circuit 7, in other words, the number of tracks crossed by the pickup 3 is counted. The pickup 3 continues to be driven by the thread motor 4 to cross the tracks until the count reaches a specified value.

Figure 10A:
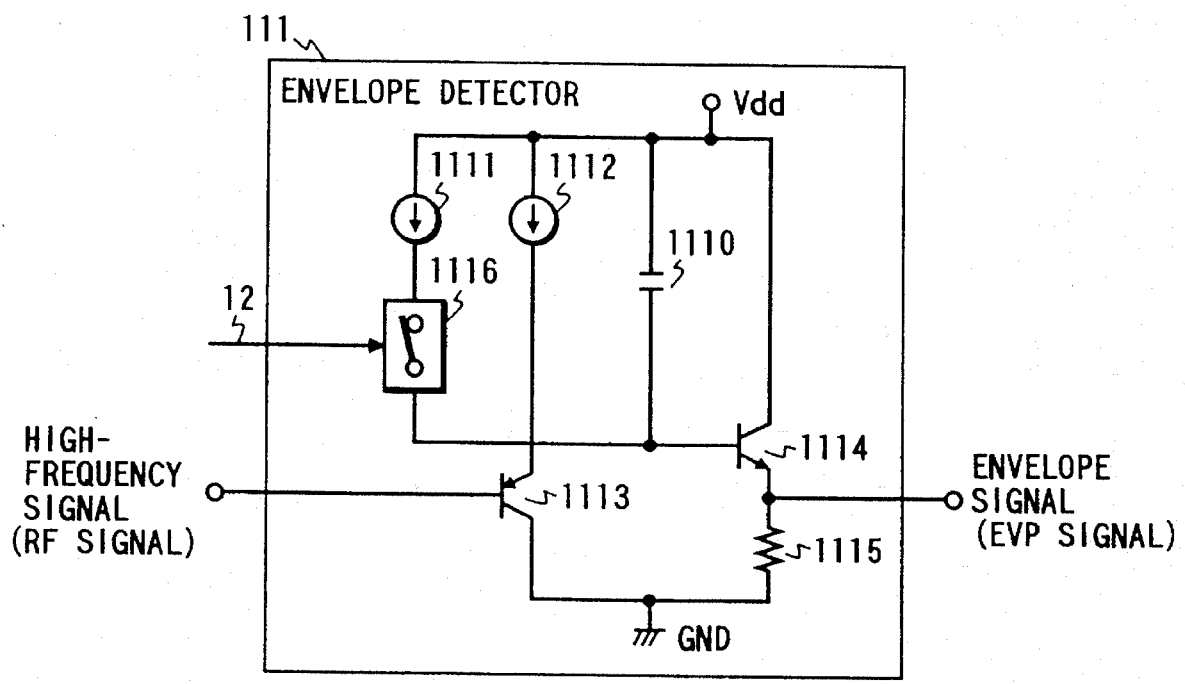
FIG. 10A is an example circuit of an envelope detector contained in the track crossing signal generation circuit.

The detection time constant switching circuit (means) 100 that receives a command for switching from the quadruple speed mode to the standard speed mode is included in the envelope detector 111. FIG. 10A shows an example circuit of the envelope detector 111. In this circuit, a parallel circuit of a capacitor 1110 and constant current sources 1111, 1112 is connected between a power supply Vdd and an emitter of a PNP transistor 1113. A collector of the PNP transistor 1113 is connected to a Ground GND and its emitter output is connected to a base of an NPN transistor 1114. The NPN transistor 1114 and a resistor 1115 form an emitter-follower output circuit. One constant current source 1111 can be selectably isolated from the emitter of the PNP transistor 1113 by a switch 1116. The switch 1116 and the constant current source 1111 form the detection time constant switching circuit (means) 100.

Figure 10B:
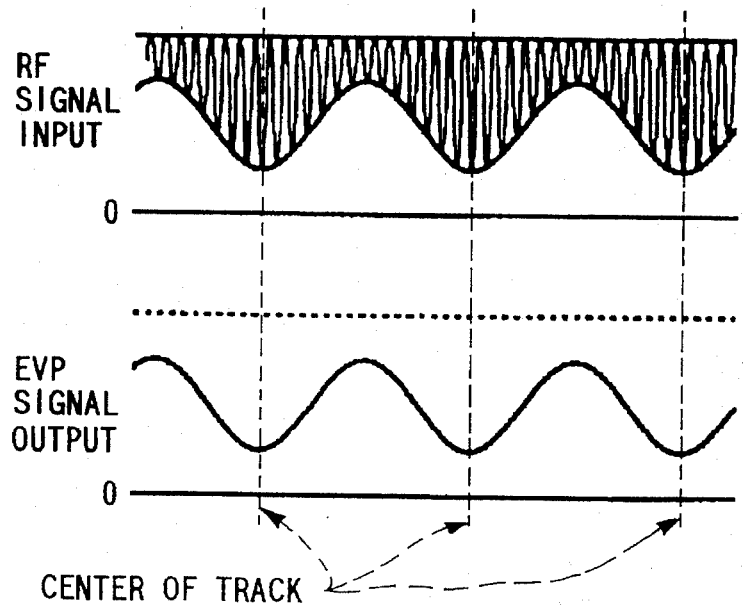
FIG. 10B is a waveform diagram showing an RF signal and an EVP signal produced in the circuit of FIG. 10A.

The PNP transistor 1113 is supplied the high-frequency signal RF at its base. The capacitor 1110 connected to the emitter of the PNP transistor 1113 is charged and discharged through the constant current sources 1111, 1112 every cycle of the high-frequency signal RF, with charging performed in a period when the difference between the waveform of the high-frequency signal RF and its peak increases, and with discharging performed in a reverse period. The discharge time constant, that is, the discharging time t is expressed as $t=c \cdot v/i$ where i represents current, v represents voltage and c represents capacitance. At the emitter of the NPN transistor 1114 is produced an envelope signal EVP corresponding to the lower side envelope of the high-frequency signal RF. The envelope signal EVP of FIG. 10B is shown as a smooth sine waveform but, when seen microscopically, actually has sawtooth noise corresponding to the discharge time constant superimposed on it.

Figure 11A:
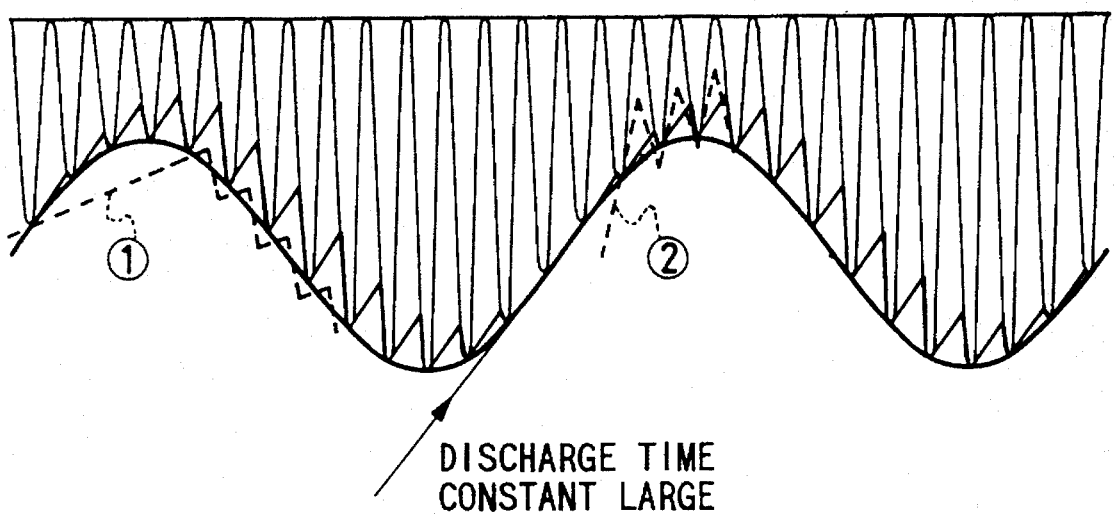
FIG. 11A is a waveform diagram showing an output signal of the envelope detector in the standard speed reproducing mode.
Figure 11B:
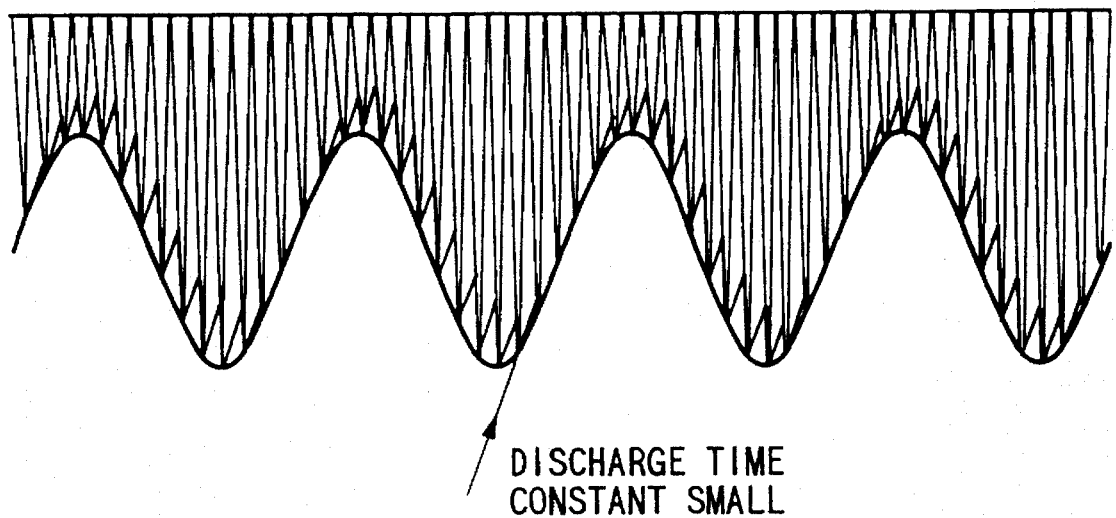
FIG. 11B is a waveform diagram showing an output signal of the envelope detector in the quadruple speed reproducing mode.

FIG. 11A and 11B show sawtooth noise components mentioned above. FIG. 11A represents the standard speed mode and FIG. 11B the quadruple speed mode. In the standard speed mode, the switch 1116 is turned off, and device constants of the envelope detection circuit are determined so that an optimum discharge time constant can be set in connection with the carrier frequency in the standard speed mode. For example, when in FIG. 11A the discharge time constant is too large or too small, the noise components become relatively large as indicated by broken lines (1), (2). That is, an optimum discharge time constant in relation with the carrier frequency must be chosen. In the quadruple speed mode, the carrier frequency is set high and therefore the switch 1116 is turned on to reduce the discharge time constant. Even when the envelope frequency is increased by reducing the discharge time constant and increasing the carrier frequency, in other words, even when the movement of the pickup 3 by the thread motor 4 is made faster, the resulting noise can be rendered equal to that of FIG. 11A. This allows the track crossing signal TCR to be increased in frequency, which in turn makes it possible to produce a good track crossing signal TCR even when the pickup is moved at high speed to a desired track during data access. In the track count access system, too, the high-speed movement of the pickup 3 becomes possible during the quadruple speed mode. In other words, in the apparatus whose operation mode is switched between the quadruple speed mode and the standard speed mode, it is possible to optimize the track crossing speed of the pickup 3 by selecting a desired one from two speeds. If the discharge time constant is fixed in optimum relationship with the quadruple speed mode, the standard speed operation produces noise as shown by the broken line (2). This nearly cancels the advantage, in the track jump operation, of activating the standard speed mode in which to perform the retry processing when an uncorrectable error persists during the quadruple speed mode. Conversely, if the discharge time constant is fixed in optimum relationship with the standard speed mode, the quadruple speed operation causes noise equivalent to that indicated by the broken line (1) of FIG. 11A when the pickup is moved at high speed as represented by the waveform of FIG. 11B during the quadruple speed mode. This makes it impossible to increase the movement speed of the pickup 3 in the track jump operation during the quadruple speed mode.

Figure 12:
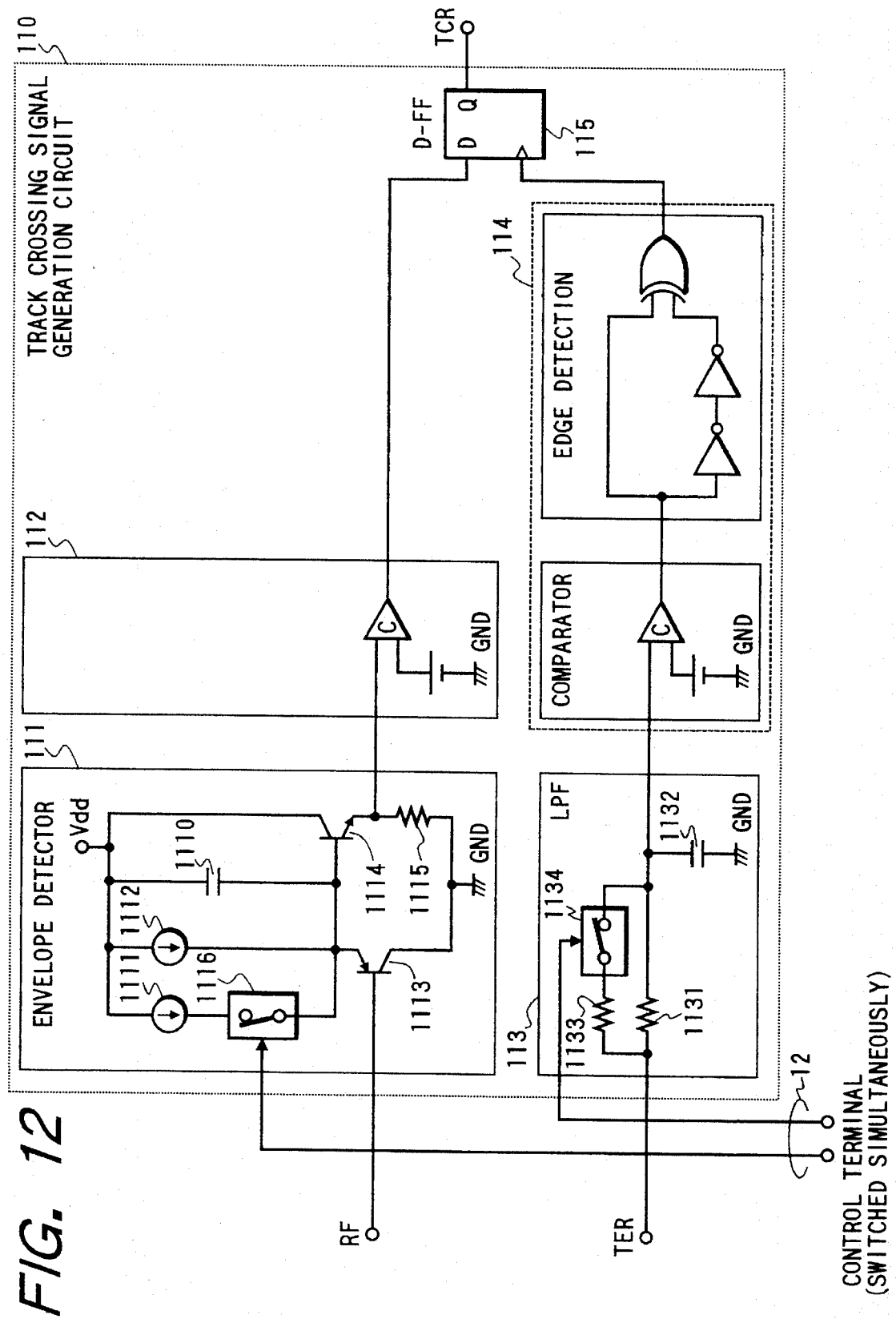
FIG. 12 is a circuitry of a track crossing signal generation circuit that permits the low-pass filter, which receives the tracking error signal, to change the pass band frequency.
Figure 13A:
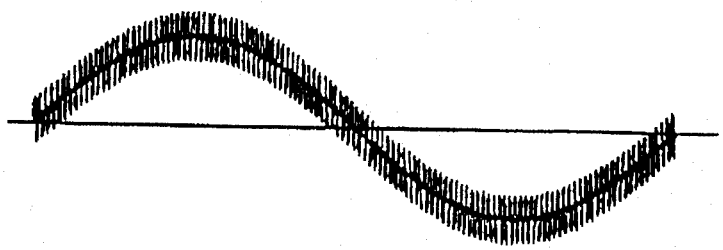
FIG. 13A is a waveform diagram showing the output from a low-pass filter optimized for the quadruple speed in the standard speed mode.
Figure 13B:
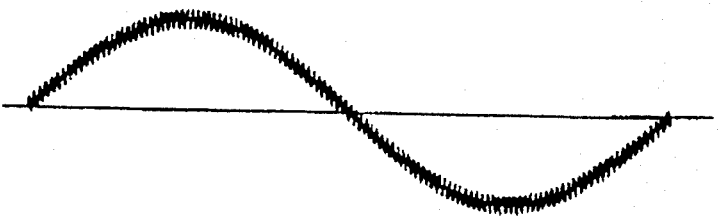
FIG. 13B is a waveform diagram showing the output from a low-pass filter optimized for the standard speed in the standard speed mode.
Figure 13C:
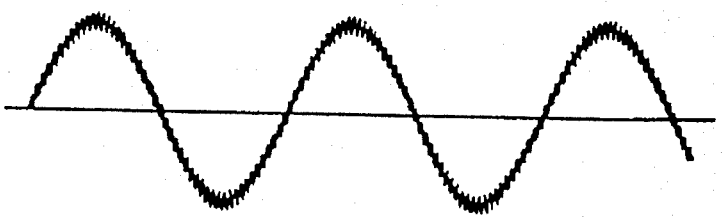
FIG. 13C is a waveform diagram showing the output from a low-pass filter optimized for the quadruple speed in the quadruple speed mode.

FIG. 12 shows another example of the track crossing signal generation circuit. In this example, the low-pass filter 113, too, switches the frequency characteristic between the standard speed mode and the quadruple speed mode. This low-pass filter 113 consists mainly of a primary low-pass filter made up of a resistor 1131 and a capacitor 1132. It also has a series circuit of a resistor 1133 and a switch 1134 connected in parallel with the resistor 1131. The switch 1134 is operated to change the pass band. With the switch 1134 turned on, the pass band frequency is switched to a high level. The envelope detector is the same as explained in FIG. 10A. The switches 1116, 1134 are both turned off in the standard speed mode and turned on in the quadruple speed mode. Where a low-pass filter is used which is of a type that does not perform the pass band switching, i.e., a low-pass filter that is optimized for the quadruple speed mode by keeping the switch 1134 turned on at all times and which has a characteristic of FIG. 13A in the standard speed mode and a characteristic of FIG. 13C in the quadruple speed mode, it is possible, when the pass band is switched, to obtain a waveform as shown in FIG. 13B with little noise even during the standard speed mode. Not only is the low-pass filter 113 optimized in the quadruple speed mode, but this noise reduction in the tracking error signal TER achieves the objective of activating the standard speed mode in which to perform the retry processing for improving the error correction when an error persists that cannot be corrected in the quadruple speed mode. This circuit, therefore, contributes to the improvement of the quality of the track crossing signal TCR and to the realization of stable accesses not only during the quadruple speed mode but also in the retry processing during the standard speed mode.

The CD-ROM disk may include audio information in CD format in addition to data. Such a CD-ROM disk is played back at high speed for data, and at standard speed for audio information or music. Whether the information being reproduced is data or audio information can be determined by checking the information contained in the subcode field. The system control circuit 11 therefore can decide at which speed the reproduction should be carried out according to the subcode field information. To describe in more detail, the switch between the quadruple speed and the standard speed is controlled according to the sequence of FIG. 4 and at the same time, when the object information being accessed is audio data, an additional control is made to activate the standard speed mode. This embodiment optimizes the frequency characteristic of the adder and waveform equalizer 606 in the high-frequency amplifier 6 by making it switchable between predefined values according to the quadruple and standard speed modes. It also optimizes the characteristics of the envelope detector 111 and the low-pass filter 113—which generate the track crossing signal TCR used in the track jump—by making it switchable between predefined values according to the quadruple and standard speed modes. Because of the optimization of characteristics, it is possible to realize high-quality reproduction for both audio information and other data.

This embodiment offers the following advantages.

(1) When an uncorrectable read error occurs during the quadruple speed mode, the operation mode is changed to the standard speed mode for retries. This reduces the signal read speed to one-fourth and thereby improves the C/N ratio by 6 dB, which is effective for correction of random errors. Therefore, system reliability is improved.

(2) Because the adder and waveform equalizer 606 is so configured that its frequency band is switchable between two different bands, i.e., widened during the quadruple speed mode and narrowed during the standard speed mode, it is possible to optimize the frequency characteristic of the adder and waveform equalizer 606 according to the quadruple speed mode and the standard speed mode. This ensures further improvement of the performance when it is attempted to improve the correction of errors that failed to be corrected in the quadruple speed mode.

(3) During the quadruple speed mode the carrier frequency is increased. In the quadruple speed mode the envelope detector 111 is switched for a smaller discharge time constant. Even when the envelope frequency is increased by reducing the discharge time constant and increasing the carrier frequency, in other words, even when the movement of the pickup 3 by the thread motor 4 is made faster, the resulting noise can be rendered equal to that of the standard speed mode. This allows the track crossing signal TCR to be increased in frequency, which in turn makes it possible to produce a good track crossing signal TCR even when the pickup 3 is moved at high speed to a desired track during data access in the quadruple speed mode. In the track count access system, too, the high-speed movement of the pickup 3 becomes possible during the quadruple speed mode. In other words, in the apparatus whose operation mode is switched between the quadruple speed mode and the standard speed mode, it is possible to optimize the track crossing speed of the pickup 3 by selecting from two speeds. It is therefore possible to improve the error correction of a signal used for the track jump by performing in the standard speed mode the retry processing to correct errors uncorrected during the quadruple speed mode.

(4) The low-pass filter 113, which receives the tracking error signal TER, is also switched for different frequency characteristics depending on speed mode. That is, the pass band frequency is set to a low band during the standard speed mode and to a high band during the quadruple speed mode. This configuration ensures generation of a waveform with little noise even during the standard speed mode. Not only is the low-pass filter 113 optimized in the quadruple speed mode, but this noise reduction in the tracking error signal TER achieves the objective of activating the standard speed mode in which to perform the retry processing for improving the error correction when an error persists that cannot be corrected in the quadruple speed mode. This circuit, therefore, contributes to the improvement of the quality of the track crossing signal TCR and to the realization of stable accesses not only during the quadruple speed mode but also in the retry processing during the standard speed mode.

(5) The frequency characteristic of the adder and waveform equalizer 606 in the high-frequency amplifier 6 is optimized by making it switchable between predefined values according to the quadruple and standard speed modes; and the characteristics of the envelope detector 111 and the low-pass filter 113—which generate the track crossing signal TCR used in the track jump—are also optimized by making them switchable between predefined values according to the quadruple and standard speed modes. Because of the optimization of characteristics, it is possible to realize high-quality reproduction for both audio information and other data by setting the standard speed mode even when the object information being accessed is audio data.

The invention has been described in detail in conjunction with the preferred embodiments and it is noted that the invention is not limited to these embodiments but that various modifications may be made without departing from the spirit of the invention.

For example, the quadruple speed may be changed to any arbitrary speed N times the standard speed. The switching of the discharge time constant in the envelope detector may be controlled by capacitance in addition to the current source. The circuit configurations of the adder and waveform equalizer, the envelope detector and the low-pass filter are limited to the foregoing embodiments but may incorporate a variety of modifications. The technique of error detection and stopping may be arbitrarily determined. The memory location to store information used to decide whether the contents of the data field is audio information or data may be other locations that of the above embodiment.

Although the above description concerns a case where the invention is applied to the CD-ROM reproducing apparatus, a field of application from which the invention has originated, it is possible to apply the invention to a wide range of fields including apparatuses which reproduce recorded information from disks, such as CDV, WORM, rewritable CD, and magnetooptic disk.

A representative aspect of this invention may be briefly summarized as follows.

It is possible to lower the rate of error correction failure for read signals without sacrificing the data transfer speed even when the disk condition is bad.

It is possible to provide an apparatus for reproducing recorded information, which can be optimized according to variations of the read signal frequency when the reproduction speed is changed in response to the access conditions such as error correction failure and kind of read information.

We claim:

1. An apparatus for reproducing recorded information, which reads recorded information from a disk surface and which performs error detection and then outputs the reproduced information while detecting and correcting errors in the information, said apparatus comprising:

a control means to switch a reproduction mode from a first speed reproduction mode to a second speed reproduction mode in response to an error correction failure condition generated in the first speed mode and to retry reading the information read with an error uncorrectable in the first speed mode, the first speed mode being for reading recorded information at a first speed to reproduce it, the second speed mode being for reading at a second speed slower than the first speed to reproduce the recorded information that failed to be read correctly in the first speed reproduction mode, the first speed mode being more than two times faster than the second speed mode; and a high frequency amplifier having a band switching means that makes a reproducing band narrower in the second speed mode than in the first speed mode.

2. An apparatus for reproducing recorded information, which reads recorded information from a disk surface by use of a pickup and which performs error detection and then outputs the reproduced information while detecting and correcting errors in the information, said apparatus comprising:

a control means to switch a reproduction mode from a first speed reproduction mode to a second speed reproduction mode in response to an error correction failure condition generated in the first speed mode and to retry reading the information read with an error uncorrectable in the first speed mode, the first speed mode being for reading recorded information at a first speed to reproduce it, the second speed mode being for reading at a second speed slower than the first speed to reproduce the recorded information that failed to be read correctly in the first speed reproduction mode, the first speed mode being more than two times faster than the second speed mode;

a servo circuit having a track crossing signal generation circuit to generate a track crossing signal which changes according to a track crossing cycle when the pickup is forcibly moved in a direction crossing the track to jump to a desired track; and the track crossing signal generation circuit including an envelope detector to detect an envelope signal for a high-frequency signal output from a high-frequency amplifier and a low-pass filter to remove a high-frequency component from a tracking error signal output from the high-frequency amplifier, and latches a binary signal of an envelope signal in synchronism with an edge transition of a binary pulse signal of the output of the low-pass filter to generate the track crossing signal, wherein the envelope detector generates the envelope signal by performing charging and discharging according to a cycle of the high-frequency signal output from the high-frequency amplifier, and includes a detection time constant switching means that makes the discharge time constant larger in the second speed mode than in the first speed mode.

3. An apparatus for reproducing recorded information comprising:

a disk motor to drive a disk which stores information on a spiral track thereof;

a pickup to read information recorded on the track of the surface of the disk;

a high-frequency amplifier to amplify the information read through the pickup;

a servo circuit to control the position of the pickup on the track according to an output of the high-frequency amplifier;

a digital signal processing means to control the rotating speed of the disk motor according to the output of the high-frequency amplifier and to perform demodulation and error detection and correction processing on read information obtained from the output of the high-frequency amplifier; and a control means to switch a reproduction mode from a first speed mode to a second speed mode in response to an error correction failure condition generated in the first speed mode and to retry reading the information read with an error uncorrectable in the first speed mode, the first speed mode being for reading recorded information at a first speed to reproduce it, the second speed mode being for reading at a second speed slower than the first speed to read and reproduce the recorded information that failed to be read correctly in the first speed mode, wherein the high frequency amplifier has a band switching means that makes a reproducing band narrower in the second speed mode than in the first speed mode.

4. An apparatus for reproducing recorded information according to claim 3, wherein the band switching means comprises a circuit element for changing a frequency characteristic and a switch element for selectively isolating the circuit element, and is provided in a waveform equalizing filter, which forms a peak at a boundary between a low frequency pass band and a frequency attenuation band for read information from the pickup to perform waveform equalization.

5. An apparatus for reproducing recorded information according to claim 3, wherein the servo circuit includes a circuit to generate a track crossing signal which changes according to a track crossing cycle when the pickup is forcibly moved in a direction crossing the track to jump to a desired track;

wherein the track crossing signal generation circuit comprises an envelope detector to detect an envelope signal for a high-frequency signal output from the high-frequency amplifier and a low-pass filter to remove a high-frequency component from a tracking error signal output from the high-frequency amplifier, and latches a binary signal of the envelope signal in synchronism with an edge transition of a binary pulse signal of the output of the low-pass filter to generate the track crossing signal;

wherein the envelope detector generates the envelope signal by performing charging and discharging according to a cycle of the high-frequency signal output from the high-frequency amplifier, and includes a detection time constant switching means that makes the discharge time constant larger in the second speed mode than in the first speed mode.

6. An apparatus for reproducing recorded information according to claim 4, wherein the servo circuit includes a track crossing signal generation circuit to generate a track crossing signal which changes according to a track crossing cycle when the pickup is forcibly moved in a direction crossing the track to jump to a desired track;

wherein the track crossing signal generation circuit comprises an envelope detector to detect an envelope signal for a high-frequency signal output from the high-frequency amplifier and a low-pass filter to remove a high-frequency component from a tracking error signal output from the high-frequency amplifier, and latches a binary signal of the envelope signal in synchronism with an edge transition of a binary pulse signal of the output of the low-pass filter to generate the track crossing signal; and wherein the envelope detector generates the envelope signal by performing charging and discharging according to a cycle of the high-frequency signal output from the high-frequency amplifier, and includes a detection time constant switching means that makes the discharge time constant larger in the second speed mode than in the first speed mode.

7. An apparatus for reproducing recorded information according to claim 5, wherein the low-pass filter has a pass band switching means which, in the second speed mode, increases the frequency pass band compared to that in the first speed mode.

8. An apparatus for reproducing recorded information according to claim 6, wherein the envelope detector includes a capacitance and a constant current circuit to determine the discharge time constant, and switches the amount of current flowing in the constant current circuit to a greater value to increase the detection time constant.

9. An apparatus for reproducing recorded information according to claim 6, wherein the low-pass filter has a pass band switching means which, in the second speed mode, increases the frequency pass band compared to that in the first speed mode.

10. An apparatus for reproducing recorded information according to claim 8, wherein the low-pass filter has a pass band switching means which, in the second speed mode, increases the frequency pass band compared to that in the first speed mode.

11. An apparatus for reproducing recorded information according to claim 10, wherein the first speed is more than two times faster than the second speed.

12. An apparatus for reproducing recorded information comprising:

a disk motor to drive a disk which stores information on a spiral track thereof;

a pickup to read information recorded on the track of the surface of the disk;

a high-frequency amplifier to amplify the information read through the pickup;

a servo circuit to control the position of the pickup on the track according to an output of the high frequency amplifier;

a digital signal processing means to control the rotating speed of the disk motor according to the output of the high-frequency amplifier and to perform demodulation and error detection and correction processing on read information obtained from the output of the high frequency amplifier; and a control means to switch a reproduction mode from a first speed mode to a second speed mode in response to an error correction failure condition generated in the first speed mode and to retry reading the information read with an error uncorrectable in the first speed mode, the first speed mode being for reading recorded information at a first speed to reproduce it, the second speed mode being for reading at a second speed slower than the first speed to read and reproduce the recorded information that failed to be read correctly in the first speed mode, wherein the servo control means includes a track crossing signal generation circuit to generate a track crossing signal which changes according to a track crossing cycle when the pickup is forcibly moved in a direction crossing the track to jump to a desired track, wherein the track crossing signal generation circuit comprises an envelope detector to detect an envelope signal for a high-frequency signal output from the high-frequency amplifier and a low-pass filter to remove a high-frequency component from a tracking error signal output from the high-frequency amplifier, and latches a binary signal of the envelope signal in synchronism with an edge transition of a binary pulse signal of the output of the low-pass filter to generate the track crossing signal, wherein the envelope detector generates the envelope signal by performing charging and discharging according to a cycle of the high-frequency signal output from the high-frequency amplifier, and includes a detection time constant switching means that makes the discharge time constant larger in the second speed mode than in the first speed mode.

13. An apparatus for reproducing recorded information according to claim 12, wherein the envelope detector includes a capacitance and a constant current circuit to determine the discharge time constant, and switches the amount of current flowing in the constant current circuit to a greater value to increase the detection time constant.

14. An apparatus for reproducing recorded information according to claim 13, wherein the low-pass filter has a pass band switching means which, in the second speed mode, increases the frequency pass band compared to that in the first speed mode.

15. An apparatus for reproducing recorded information according to claim 14, wherein the first speed is more than two times faster than the second speed.

* * * * *